United States Patent [19]

Loughlin

[11] Patent Number: 5,549,034
[45] Date of Patent: Aug. 27, 1996

[54] WRIST PIN FOR PISTON AND CONNECTING ROD ASSEMBLY

[75] Inventor: Neil W. Loughlin, Ortonville, Mich.

[73] Assignee: Chrysler Corporation, Highland Park, Mich.

[21] Appl. No.: 540,376

[22] Filed: Oct. 6, 1995

[51] Int. Cl.⁶ .................................................. F16J 1/14
[52] U.S. Cl. .................... 92/187; 92/208; 94/579 E
[58] Field of Search .................. 92/186, 187; 123/193.6; 74/579 E

[56] References Cited

U.S. PATENT DOCUMENTS

| | | |
|---|---|---|
| 1,489,111 | 4/1924 | Blackshear . |
| 1,491,155 | 4/1924 | McKone ..................................... 92/187 |
| 1,684,862 | 9/1928 | Gay ............................................ 92/187 |
| 1,772,187 | 8/1930 | Manning . |
| 2,043,013 | 6/1936 | Shoemaker ................................ 92/187 |
| 2,100,525 | 11/1937 | Sorensen . |
| 2,851,319 | 9/1958 | Pitner ........................................ 92/187 |
| 3,479,929 | 11/1969 | Fangman . |
| 3,943,908 | 3/1976 | Kubis et al. . |
| 3,971,355 | 7/1976 | Kottmann ............................. 123/193.6 |
| 5,367,945 | 11/1994 | Halka et al. . |

FOREIGN PATENT DOCUMENTS

| | | | |
|---|---|---|---|
| 510490 | 12/1920 | France ....................................... 92/187 |
| 2615212 | 10/1977 | Germany .................................. 92/187 |
| 3139686 | 4/1983 | Germany .................................. 92/187 |
| 244829 | 12/1925 | United Kingdom ...................... 92/187 |

OTHER PUBLICATIONS

*Auto Service and Repair,* M. W. Stockel et al., The Goodheart–Willcox Company, Inc., p. 280, c 1978.

Primary Examiner—Thomas E. Denion
Attorney, Agent, or Firm—Kenneth H. MacLean

[57] ABSTRACT

Metallic piston, wrist pin and connecting rod which normally do not fit together can be joined with one selected component being heated to effect the expansion thereof while another selected component is chilled to effect its contraction. With the heat differentials effecting relative size change the components can be loosely put together in a preassembly. The components in the loose preassembly are then returned to ambient temperature and to specification size whereby a central journal of the wrist pin is trapped between the piston pin bosses in one embodiment and the connecting rod is trapped by the shoulders of a reduced diameter pin journal in a second embodiment to form permanent piston, connecting rod and wrist pin assemblies.

8 Claims, 4 Drawing Sheets

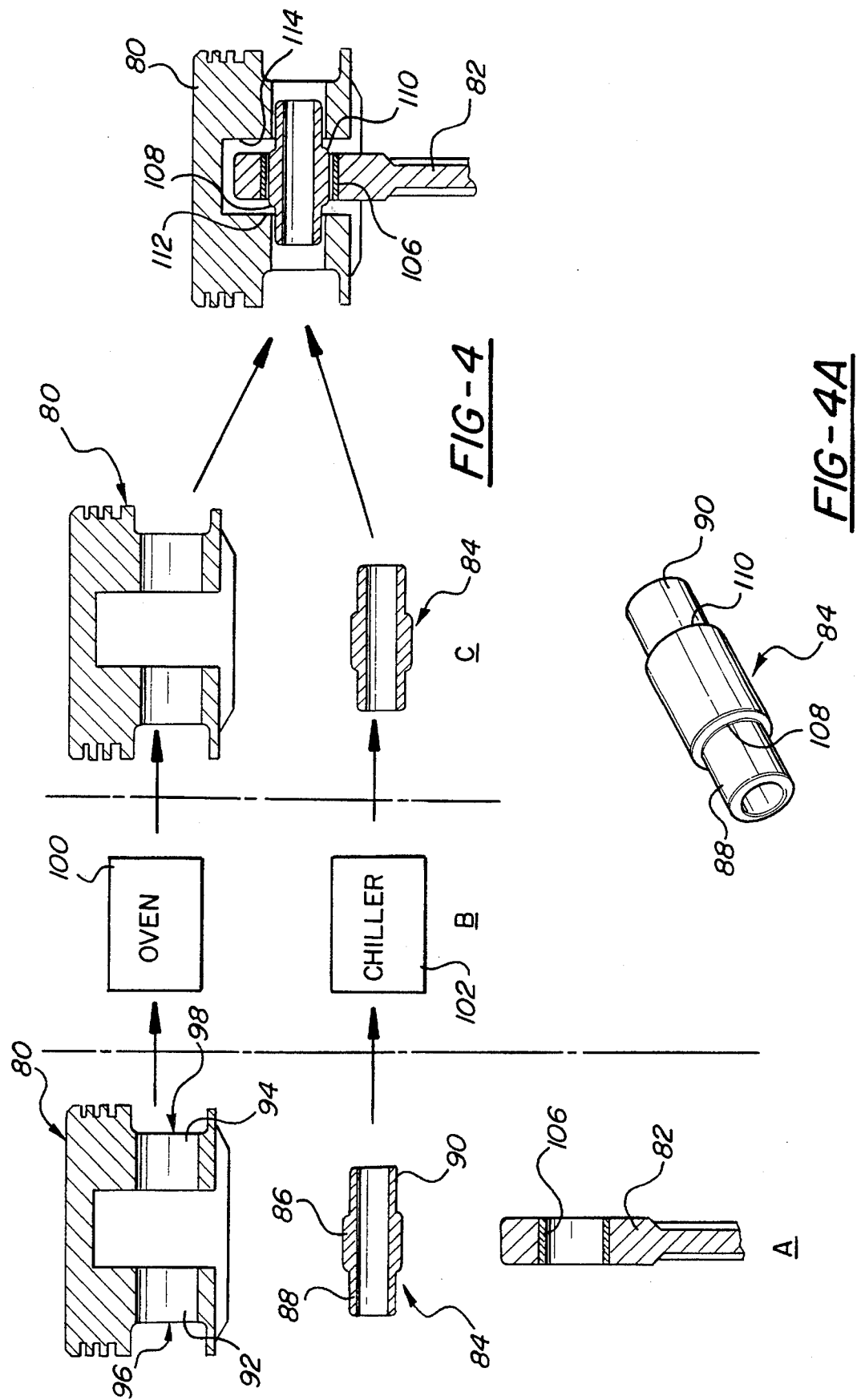

WRIST PIN FOR PISTON AND CONNECTING ROD ASSEMBLY

TECHNICAL FIELD

This invention relates to piston wrist pin and connecting rod assemblies for stroking operation in associated cylinders, and more particularly, to new and improved wrist pin connections for the articulation of pistons to associated connecting rods and to new and improved heat differential methods for connecting pistons to connecting rods.

BACKGROUND OF THE INVENTION

In many piston powered units, such as compressors and internal combustion engines, full floating piston or wrist pins are used to operatively connect connecting rods with pistons for operating in an associated cylinder. Such pins advantageously provide two stages or levels of pin freedom for reducing pin and bearing friction and wear. When properly installed in a piston and rod assembly, these pins possess the capability of turning in the pin bearing, or bores, of laterally spaced bosses of the piston and also relative to the pin bearing or bushing at the small end of the connecting rod through which the pin extends.

Axial thrust loads applied to wrist pins, such as from the sideways movement of the connecting rod during piston stroking in the associated cylinder, may cause the wrist pin to slide axially in the pin bores. If the pin is displaced to a point at which one end of the pin physically contacts and rubs against the cylinder wall, the cylinder and the piston are subject to damage often necessitating labor intensive and expensive repair.

To prevent such occurrences, wire end locks or snap rings are operatively mounted in the bores of the pin bosses at outboard of the ends of the pin to trap the pin in a substantially centered position. With the pin so held within confines of the pin boss bores and away from the cylinder walls, pin damage to the cylinder and piston is obviated. An example of such pin retention is found in *Auto Service and Repair*, M. W. Stockel et al., The Goodheart-Willcox Co., Inc., Page 280, C 1978.

In addition to wire end locks, a wide variety of other retainers have been used for similar purposes. For example, retainer clips such as shown in U.S. Pat. No. 5,367,945, issued Nov. 29, 1994 to Halka, et al., and split and two piece bearings, such as shown in U.S. Pat. No. 1,491,151, issued Apr. 22, 1924 to L. J. McKone, are used to secure wrist pins in operative position.

While these pin retention structures and methods may be satisfactory for some installations, they require special bearing structures or separate retention components which add to the cost burden of piston and connecting rod assemblies and are subject to failure, misassembly, and shortened service life, particularly, since they generally operate in a harsh environment such as in internal combustion engines.

SUMMARY OF THE INVENTION

The wrist pin, piston and connecting rod construction and method of this invention eliminates engine failures caused by broken or misassembled pin retainers, such as lock rings, by improving the connection of the wrist pin in operating position so that the retainers or lock rings would be redundant and accordingly not used.

In one embodiment, an intermediate journal of a generally cylindrical wrist or piston pin is ground with a 0.095 mm stepped diameter (outer diameter minus inner diameter) profile on its outer diameter. The piston pin boss bores are machined to a diametrical dimension approximately 0.081 mm less than the large OD of the intermediate journal pin. In order to assemble the components, the pin is chilled in liquid nitrogen (−132° C.) which shrinks the pin OD. At this time, the piston is heated to 176° C. which expands internal diameter of the pin boss bores. The pin having a reduced diameter is easily inserted through the expanded bores of the pin bosses, and through the bushing of the connecting rod aligned between the pin bosses until the intermediate pin journal centers in the bushing. The connecting rod bushing does not require any special machining or assembly process in this embodiment. The components of the assembly are subsequently returned to ambient temperature, the pin will return to its designed dimension and be retained in the piston by the stepped intermediate journal since it is now larger than the internal diameters of the bores of the pin bosses. This stepped journal will also retain the pin in a running engine since the piston and pin typically operate within 10° C. of each other.

The pin will be free to rotate in both the piston pin boss bores and the connecting rod bushing as in the traditional full floating design. With the wire lock rings and other fasteners eliminated and with the wrist pin centrally trapped between the pin bosses in a positive manner, engine failures related to improper installation and failure of lock rings as well as other retainers are eliminated.

Another preferred embodiment with the same advantages is similar to that described except that the center or intermediate journal of the wrist pin is reduced in diameter. The assembly of the pin, rod and piston is also similar. The pin is again chilled in liquid nitrogen, but instead of heating the piston, the small end of the connecting rod is heated. This effects the relative contraction and expansion of these components so that they fit together for easy assembly. After the pin is inserted through the pin boss bores of the piston and the bushing of the connecting rod, the components are brought back to ambient temperature as previously described. In this design, the reduced diameter intermediate journal closely fits for turning within the bushing of the small end of the rod, and the end journals at opposite end of the pin having large diameters traps the connecting rod therebetween. The laterally spaced inner faces of the pin bosses trap the connecting rod and the wrist pin in a centralized position. Once assembled, the centrally trapped pin is free to rotate in both the piston and the connecting rod, but has limited axial movement so no lock rings or other pin retainers are required. The difference between this and the first described design is the location where axial thrust is applied. In this preferred design the pin, if axially loaded, would rub up against the connecting rod bushing which may be an alloy of steel and bronze, whereas in the previous design, the large diameter intermediate journal pin would rub against the pin bosses of the piston usually of an aluminum alloy.

The pin designs of this invention eliminates costs associated with auxiliary retainers. For example, the invention eliminates the cost of the lock rings; the machining of the lock ring grooves in the piston bosses; the grinding of tight tolerance chamfers on the outer ends of the pin; and the cost of installing the lock rings. Furthermore, the potential for broken and improperly installed pin retainers is eliminated and damage to the piston and cylinder walls from loose pins is eliminated or substantially reduced.

BRIEF DESCRIPTION OF THE DRAWINGS

FIG. 4 is a diagram illustrating a second preferred method of assembly of a piston, connecting rod and wrist pin;

FIG. 4a is a pictorial view of the wrist pin of FIG. 4, and

FIG. 5 is a sectional view of a piston, connecting rod and wrist pin assembled in accordance with the assembly method of FIG. 4.

DETAILED DESCRIPTION OF THE DRAWINGS

Figure 1:
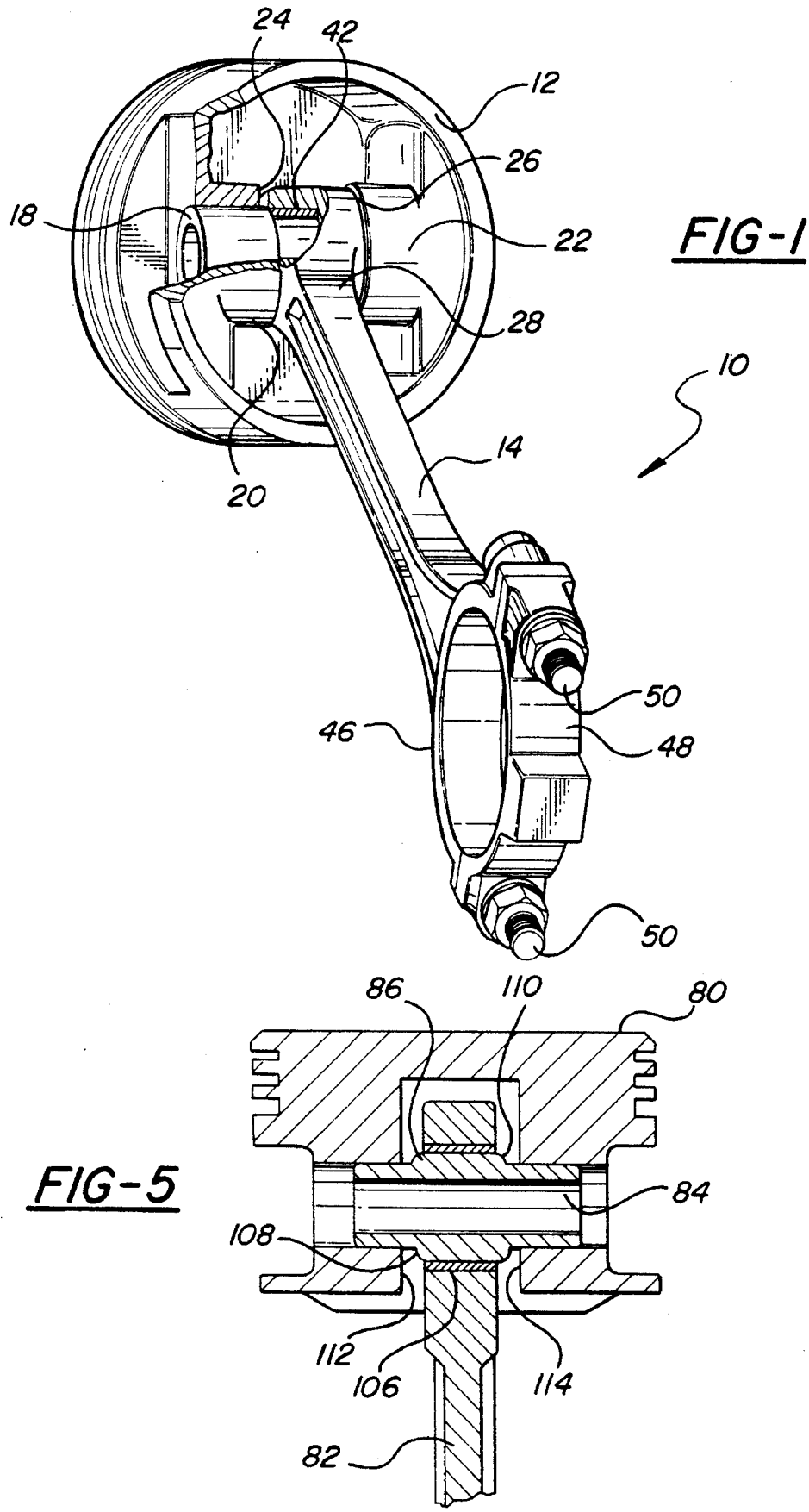
FIG. 1 is a pictorial view of a piston, connecting rod and wrist pin assembly for an internal combustion engine.

Turning now in greater detail to the drawings, there shown in FIG. 1, a piston and connecting rod assembly 10 for an internal combustion engine comprising a generally cylindrical piston 12, preferably of any aluminum based alloy articulated to an elongated connecting rod 14 by a generally cylindrical wrist pin 18 both of which are preferably steel. The piston 12 has a pair of downwardly extending and laterally spaced bosses 20, 22 which form inner structure thereof. The bosses have inner shoulders 24, 26 which are separated from one another to provide the space 27 to accommodate the pivotal upper end 28 of the connecting rod 14. The bosses 20, 22 have aligned bores 30 and 32 formed therein which serve as bearings for the wrist pin 18.

Figure 2:
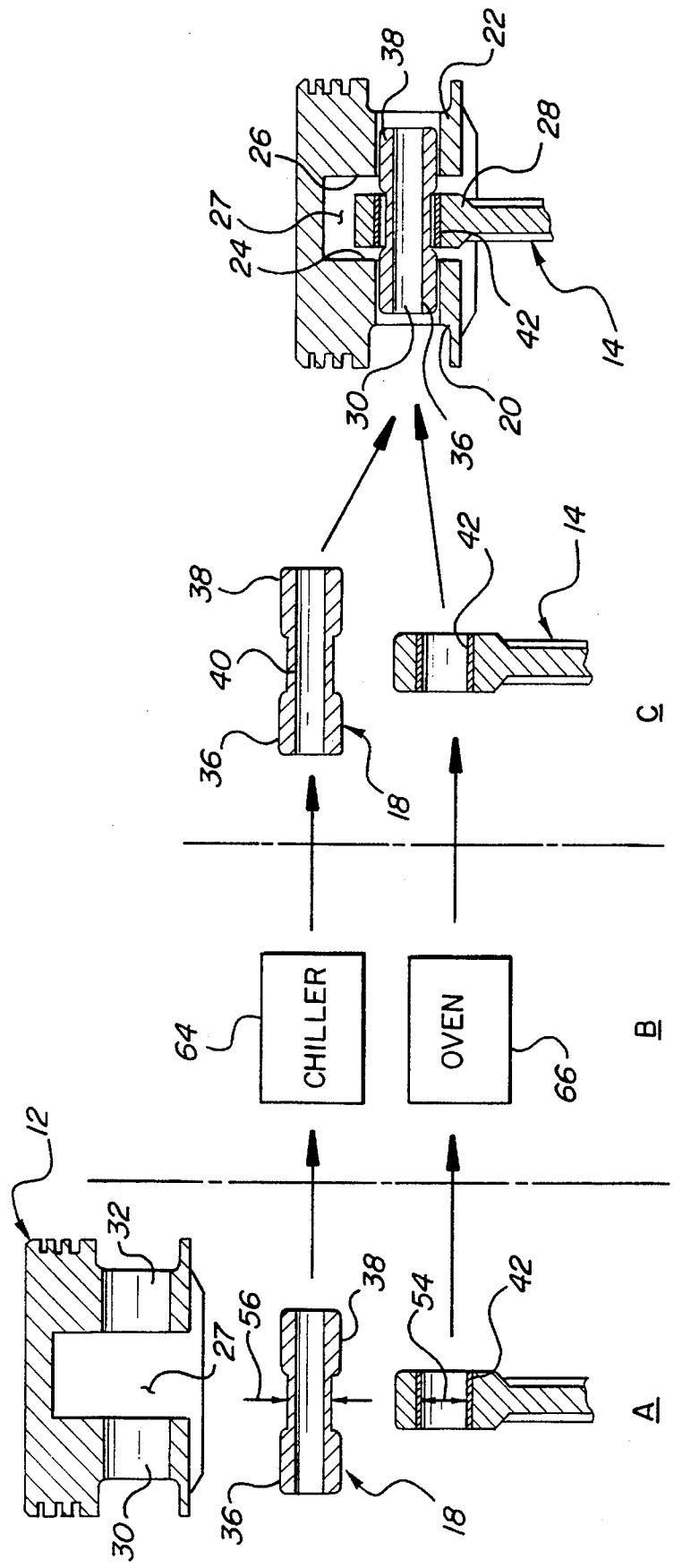
FIG. 2 is a diagram illustrating a first preferred assembly of a piston, connecting rod and wrist pin according to this invention.
Figure 2A:
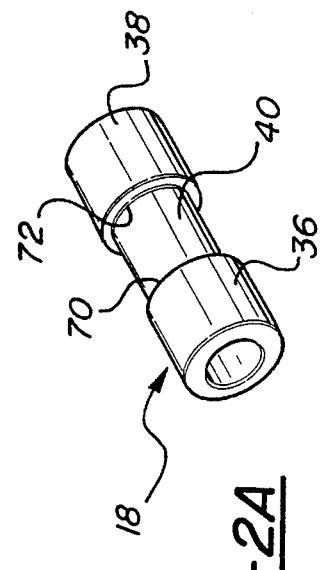
FIG. 2a is a pictorial view of the wrist pin of FIG. 2.
Figure 3:
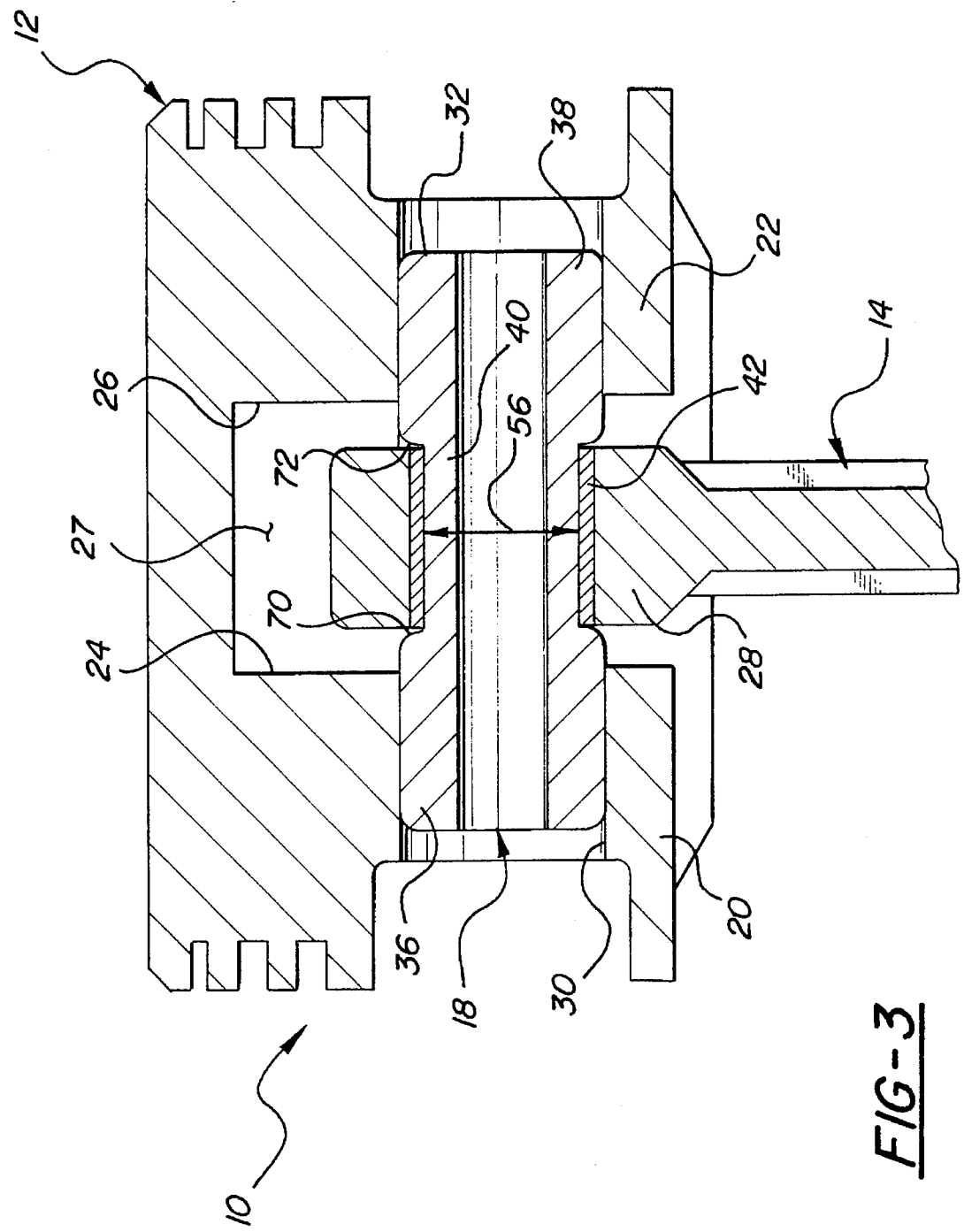
FIG. 3 is a sectional view of a piston, connecting rod and wrist assembly according to the assembly method of FIG. 2.

As shown more particularly in FIGS. 2a and 3, the wrist pin 18 has large diameter outboard end journals 36, 38, at opposite ends of a small diameter intermediate journal 40, which respectively rotatably mount in pin boss bores 30, 32 while the small diameter steel and bronze bushing 42 pressed into the upper end 28 of connecting rod 14 provides for relative turning movement between the pin and connecting rod 14.

The lower end of the connecting rod is formed with semi-cylindrical yoke 46 and has a semi-cylindrical cap 48 secured thereto by threaded fasteners 50 to define the "big end bore" 52 which connects to a crank pin of the crankshaft of an engine, not shown.

The wrist pin preferably has two degrees of freedom, that is the pin can rotate within the bearings provided by the bores of the pin bosses, and furthermore, can turn relative to the bushing of connecting rod 14. With such construction, the frictional wear of the pin while the piston is operating in its cylinder is reduced to provide for an improved connection with longer service life.

The present invention provides an improved method of assembly. Normally, the steel-bronze bushing 42 of connecting rod 14 has an inner diameter 54 which is just slightly greater than the outer diameter 56 of the recessed intermediate journal 40 of pin 18 to provide for articulation.

Because of the larger diameters of the two equally sized end journals 36, 38 of the pin 18, it would be normally difficult to pass the pin 18 through the smaller diameter bushing 42 of the connecting rod 14. More particularly, at ambient temperatures, there would be such interference between the outer journals 36, 38 of the pin 18 and the internal diameter 54 of the rod bushing 42 that axial insertion of the outer pin journals through the bushing at ambient temperature would not be possible.

However, to facilitate such an assembly, the pin 18 is moved from parts station A, to the left when viewing in FIG. 2 and placed into a chilling unit 64 at treatment position B which in the preferred embodiment contains liquid nitrogen.

There the pin 18 is chilled to effect the contraction and shrinkage thereof. In particular, the diameters of the outer pin journals are 36, 38 reduced so that they can be easily inserted through the bores provided by the journals of the piston pin bosses 20, 22 and the free end thereof through the bushing 42 of the rod 14 which has been expanded as hereinafter described.

More particularly, this pin insertion and installation is augmented because the rod 14 and its bushing 42 have been heated and expanded in the oven 66 at treatment station B, as shown in FIG. 2, to expand the internal diameter of the bushing. After such treatments, the connecting rod 14, piston 12 are moved to assembly station C, where the pin bores of the bosses are axially aligned with the bushing 42 of the rod 14. With this alignment and heat and chill treatments, the pin 18 can be successfully inserted axially to the centralized position shown in FIG. 2. In this position the bushing 42 of the connector rod 14 is intermediate the end journals 36, 38 and is disposed around the small diameter intermediate journal 40 of the pin.

To provide for trapping of the connecting rod onto the pin and the pin and rod in the piston, the pin and rod are then brought to an ambient temperature, i.e., 70° F. so that the pin 18 expands to specification and the connecting rod contracts to specification to trap the pin to the connecting rod. As best illustrated in FIGS. 2a and 3, inwardly facing annular shoulders 70 and 72 of the end journals of the pin at ambient and working temperatures are dimensioned to contact the end bushing 42 and the surrounding area of the rod 14, if desired, and block and limit sideways movement of the rod 14 relative to the pin. While the connecting rod 14 is trapped on the pin 18, the rod and the pin are also trapped between the two faces or shoulders 24, 26 of the depending pin bosses 20, 22 so that the assembly is completed and is operatively mounted together.

In this arrangement, the heating of the rod and the contraction of the pin does not adversely change the grain structure of the metals of these elements. Furthermore, when operating in an engine, the expansion of the parts from the heat of combustion does not significantly change the relative diameters of these bearings, bushing and journals so that the pin retains its assembled configuration, as shown in FIG. 3.

The following is one illustration of the treatment and installation of the steel pin 18 into the bores of the aluminum based piston bosses and the steel-bronze connecting rod bushing:

| AMBIENT DIMENSIONS OF COMPONENTS | |
|---|---|
| PIN OD @ OUTER END JOURNAL | 24.040 mm |
| PIN OD @ CENTER JOURNAL | 23.997 mm |
| ROD BUSHING ID | 24.008 mm |
| PISTON PIN BOSS BORE ID | 24.054 mm |
| AMBIENT PIN TO PISTON BOSS CLEARANCE | 0.014 mm |

-continued

| AMBIENT PIN TO ROD BUSHING CLEARANCE | 0.011 mm |
|---|---|

INSTALLING THE PIN

| PIN JOURNAL AT AMBIENT TEMPERATURE (outer end) OD (mm) | CHILLED PIN TEMP °C. | RADIAL CHANGE EXP. (mm) | CHILLED DIMENSION OD (mm) |
|---|---|---|---|
| 24.040 ROD BUSHING AT | −132 (−270° F.) | −0.020 | 24.020 |

| AMBIENT TEMPERATURE ID (mm) | HEAT ROD TEMP °C. | RADIAL CHANGE EXP. (mm) | HEATED DIMENSION ID (mm) |
|---|---|---|---|
| 24.008 | 232 (450° F.) | 0.038 | 24.044 |

INSTALLATION CLEARANCE:
MAX. DIAMETER PIN TO ROD BUSHING 0.024 mm

IN A RUNNING ENGINE

| AMB. PIN END OD (mm) | RUNNING PIN TEMP °C. | RADIAL EXP. (mm) | RUNNING OD (mm) |
|---|---|---|---|
| 24.040 | 180 (358° F.) | 0.028 | 24.068 |

| AMB. BUSHING ID (mm) | HEAT PISTON TEMP. °C. | RADIAL EXP. (mm) | HEATED ID (mm) |
|---|---|---|---|
| 24.008 | 190 (374° F.) | 0.029 | 24.037 |

| SHOULDER STEP RETAINING THE PIN IN THE PISTON DURING ACTUAL ENGINE RUNNING | 0.031 mm |
|---|---|

Referring now to the embodiment and method of FIGS. 4 and 5, the piston 80 and rod 82 may be same as in the first embodiment. However, in this arrangement, the steel pin 84 is formed with a large diameter intermediate journal 86 and smaller diameter end journals 88, 90, preferably of equal diameters. The internal diameter of the bores 92, 94 of the laterally spaced bosses 96, 98 of the piston 80 are increased in their internal diameters from ambient specification diameters by moving the piston 80 into an oven 100 at station B and adding heat energy thereto to effect piston expansion. As the internal diameter of the bores of the piston bosses are being increased, the pin 84 is being chilled in chilling unit 102 and reduced in diameter.

The piston 80 and piston rod 82 are placed in a suitable fixture, not shown at assembly station C. The chilled pin 84 is inserted axially into the bores 92, 94 of the pin bosses and through the aligned bushing 106 of the rod. The pin is thus in a centralized position relative to the rod and piston, as shown in FIG. 4.

The assembled parts are then allowed to return to ambient temperature so that the piston bosses and their bores contract while the pin expands. Under such conditions, the pin is trapped between the bores of the pin bosses with the intermediate journal 86 being of large diameter and providing shoulders 108, 110 on either side thereof. Those shoulders contact the shoulders 112, 114 of the pin bores to trap the pin in a centralized position. Since the connecting rod has been inserted thereon, the connecting rod is trapped in the piston for turning operation thereon on the pin.

The following chart illustrates the treatment and installation of the pin 84 into the piston boss bores and connecting rod bushing to complete the assembly, illustrated in FIG. 5:

AMBIENT DIMENSIONS OF COMPONENTS

| | |
|---|---|
| PIN OD @ OUTER JOURNALS | 23.905 mm |
| PIN OD @ CENTER JOURNAL | 24.000 mm |
| ROD BUSHING ID | 24.011 mm |
| PISTON PIN BOSS ID | 23.919 mm |
| AMBIENT PIN TO PISTON BOSS BORES CLEARANCE | 0.014 mm |
| AMBIENT PIN TO ROD BUSHING CLEARANCE | 0.011 mm |

INSTALLING THE PIN

| AMB. PIN CENTER JOURNAL OD (mm) | CHILL PIN TEMP °C. | RADIAL EXP. (mm) | CHILLED OD (mm) |
|---|---|---|---|
| 24.000 | −132 (−270° F.) | −0.017 | 23.966 |

| AMB. PIN BOSS BORE ID (mm) | HEAT PISTON TEMP °C. | RADIAL EXP. (mm) | HEATED ID (mm) |
|---|---|---|---|
| 23.919 | 176 (350° F.) | 0.040 | 23.998 |

INSTALLATION CLEARANCE:
MAX PIN DIAMETER TO PIN BOSS BORE 0.032 mm

IN A RUNNING ENGINE

| PIN CENTER AT AMBIENT TEMPERATURE OD (mm) | RUNNING PIN TEMP °C. | RADIAL CHANGE EXP. (mm) | RUNNING DIMENSION OD (mm) |
|---|---|---|---|
| 24.000 (358° F.) | 180 | 0.024 | 24.049 |

| PIN BOSS BORE AT AMBIENT TEMPERATURE ID (mm) | HEAT PISTON TEMP. °C. | RADIAL CHANGE EXP. (mm) | HEATED DIMENSION ID (mm) |
|---|---|---|---|
| 23.919 | 190 (374° F.) | 0.043 | 24.006 |

| SHOULDER STEP RETAINING THE PIN IN THE PISTON DURING ACTUAL ENGINE RUNNING | 0.043 mm |
|---|---|

While the pin is retained in the piston, should repairs or replacement become necessary, the pin can be conventionally removed and repairs effected.

Accordingly with this invention, no supplemental ring, threaded fasteners, clips, or other fasteners are needed and the pin is retained with optimum assurance in operating position with minimal number of parts.

While a preferred embodiment of the invention has been shown and described, other embodiments will now become apparent to those skilled in the art. Accordingly, this invention is not to be limited to that which is shown and described but by the following claims.

I claim:

1. A piston, connecting rod and wrist pin assembly comprising a generally cylindrical metallic piston member, an elongated metallic connecting rod member, a unitary wrist pin of metal having axially spaced cylindrical end journals of a first outer diameter integral therewith and formed at opposite outer ends thereof and further having a cylindrical connecting rod journal of a second outer diameter formed between said end journals, said connecting journal being operatively different in outer diameter as compared to the outer diameter of said end journals, said piston member having a pair of laterally spaced pin bosses, each of said pin bosses having a circular opening of a predetermined diameter therein to provide a pair of axially spaced bearings of equal internal diameters which are axially aligned with one another, said spaced bearings of said pin bosses being sized to rotatably receive and support said cylindrical end journals of said wrist pin therein, said connecting rod member having a continuous and solid upper end with a cylindrical wrist pin bearing therethrough operatively received on said connecting rod journal so that said connecting rod member is operatively mounted on said wrist pin and between said pin bosses while said connecting rod is operatively retained on said wrist pin and in said piston member by physical interference between at least one of said journals of said wrist pin and at least one of said other members of said assembly which inhibits the removal of said pin from said pin bosses of said piston member.

2. The piston, connecting rod and wrist pin assembly of claim 1, wherein said outer diameter of said connecting rod journal of said wrist pin is greater than the internal diameters of said axially spaced bearings of said pin bosses of said piston member so that there is physical interference therebetween which inhibits the removal of said wrist pin from said piston to thereby maintain said wrist pin and said piston and connecting rod members in assembly.

3. The piston, connecting rod and wrist pin assembly of claim 1, wherein said outer diameters of said end journals of said wrist pin are greater than the internal diameter of said cylindrical wrist pin bearing of said upper end of said connecting rod mounted thereon so that the upper end of the connecting rod is operatively trapped on said wrist pin and said wrist pin is operatively trapped between said pin bosses of said piston member.

4. A metallic piston, connecting rod and wrist pin assembly comprising a generally cylindrical piston having a pair of laterally spaced support bosses fixed thereto, each of said bosses having an annular opening defining cylindrical bearings of equal internal diameters therein axially aligned with one another, an elongated connecting rod having a unitary connector end that is disposed between said laterally spaced support bosses and having an annular opening extending through said connector end, said opening in said connector end having a cylindrical bearing surface that is generally axially aligned with said cylindrical bearings of said laterally spaced support bosses, a one-piece generally cylindrical wrist pin extending axially and operatively mounted in said cylindrical bearings of said laterally spaced support bosses, said pin having integral and cylindrical end journals of the same outer diameters formed on the opposite ends thereof operatively received in said associated cylindrical bearings of said support bosses and having an intermediate cylindrical journal between said end journals, said cylindrical bearing surface of said connector end of the connector rod being operatively mounted on said intermediate journal of said wrist pin so that said connecting rod is mounted for limited turning movement on said pin, said intermediate journal having an outer diameter that differs from the outer diameter of said end journals of said pin received in the bearings of said bosses to effect the entrapment of said pin and said connecting rod between said bosses and the operative linking of said connecting rod with said piston.

5. The piston, connecting rod and wrist pin assembly of claim 4, wherein said outer diameter of said intermediate journal of said pin and the inner diameter of the cylindrical bearing surface of said connector end of said rod are less than said outer diameter than said end journals of said pin so that said pin is trapped on said rod and said rod is trapped between said between said bosses.

6. The piston, connecting rod and wrist pin assembly of claim 4, wherein said bosses of said piston have walls which face one another, said intermediate journal of said pin operatively mounting said connecting rod thereon being formed with an outer diameter greater than the outer diameter of the end journals thereof and with shoulders on the opposite ends thereof that can engage said interfacing walls of said bosses to trap the pin therebetween and to thereby retain said connecting rod on said pin and in said piston.

7. The piston, connecting rod and wrist pin assembly of claim 4, wherein said bosses have inner faces opposing one another and wherein said pin is retained within said piston and said connector end of said connecting rod is retained in between said bosses by the engagement of said intermediate journal of said pin with said inner faces of bosses to prevent the axial movement of said pin beyond the outer limit of said bosses.

8. The assembly as in any one of claims 2–5, wherein said cylindrical bearings in said support bosses have outer ends, and wherein said piston, connecting rod and wrist pin form in combination with one another the sole components mechanically interconnecting themselves into said assembly and wherein said pin is restrained from moving past the outer end of said cylindrical bearings in said pin support bosses by the mechanic interconnection of said components.

\* \* \* \* \*